3,104,940
PROCESS FOR THE SEPARATION OF THORIUM AND URANIUM SALTS

Kazimierz Josef Bril, Rua 4, No. 89, and Pawel Krumholz, Rua Maestro Elias Lobo 241, both of Sao Paulo, Sao Paulo, Brazil
No Drawing. Filed Aug. 28, 1959, Ser. No. 836,607
Claims priority, application Brazil Sept. 2, 1958
2 Claims. (Cl. 23—14.5)

This invention relates to a process for the recovery of thorium, and for the separation of thorium from uranium, dissolved as nitrates in an organic solvent.

Thorium and uranyl nitrates are efficiently separated from other metals by extracting aqueous solutions of the nitrates with organic solvents, such as ethers, ketones, alkyl phosphates, particularly tributyl phosphate, etc. It is common practice to re-extract the thorium nitrate from the resulting organic solvent solutions by means of water or dilute acids. If the organic solvent solution contains both thorium and uranyl nitrates, a considerable part of the uranyl nitrate will also be extracted, along with the thorium nitrate. The thorium nitrate, which is consequently dissolved in the aqueous extract, is eventially recovered by evaporation of the extract or by precipitation from the extract in the form of a compound of low solubility, such as the oxalate. Where both thorium and uranyl nitrates are present in the aqueous extract, separation of the thorium from the uranium may be accomplished by repeated extractions with an organic solvent, in which the uranium transfers from the aqueous solution to the organic solvent. However, such procedures are tedious, time-consuming and expensive. The initial re-extraction of the thorium nitrate from the organic solvent solution with water requires a multi-stage procedure in order to obtain aqueous solutions which are not too dilute with respect to solute and to minimize losses of organic solvent due to some of the solvent dissolving in the extracting water. Also, subsequent re-extraction of the aqueous solution with organic solvent to extract uranium nitrate involves a tedious, costly, multi-stage process.

In addition to the foregoing disadvantages of the prior commercial methods of separating thorium from uranium, elaborate and costly equipment is necessary, and the degree of separation of thorium from uranium is not all that is to be desired. Thus, a considerable fraction of any uranium initially present as the nitrate in the organic solvent solution will pass with the thorium nitrate into the aqueous extract. In most cases between 5 and 30% of the uranium passes into the aqueous phase along with the thorium, thus providing an unsatisfactorily low decontamination factor or degree of separation for the two metals.

There has been a great need for obtaining maximum separation of thorium from uranium, including uranium 233 since it is desirable to obtain chemically or atomically pure thorium for use in processing irradiated nuclear fuels.

It is, therefore, an object of the present invention to overcome the shortcomings of the prior art processes for recovering and separating thorium from mixtures with uranium.

It is also an object of the present invention to provide an improved and highly efficient process for effectively recovering and separating thorium from mixtures with uranium dissolved in organic solvent solutions as nitrates of the two metals.

It is another object of the present invention to provide a process for selectively and simultaneously extracting and precipitating thorium from solutions which also contain uranium dissolved therein.

Other objects will be apparent to those skilled in the art from reading this specification.

The process of the present invention comprises selectively and simultaneously extracting and precipitating thorium from uranium, where both metals are dissolved as their nitrates in an organic solvent, by extracting the organic solvent solution, containing the thorium and uranyl nitrates dissolved therein, with an aqueous solution of an agent which selectively precipitates the thorium as a crystalline compound which is insoluble in, but transferred to, the aqueous phase. Most of the uranium remains in the organic phase and can be recovered from it by conventional methods, e.g., by extraction with water or with a solution of an alkali carbonate. The small amount of uranium extracted together with the thorium into the aqueous phase can be easily recovered by solvent extraction, after or before the filtration of the thorium precipitates.

The selective precipitating agents useful in the practice of the process of the present invention include aqueous solutions containing the sulfate, bisulfate or oxalate anions. Sulfuric and oxalic acids are satisfactory, as well as water-soluble salts of sulfuric and oxalic acids. Among the water-soluble sulfate, bisulfate or oxalate salts which may be employed in the invention, are the ammonium salts, the alkali metal salts, including the sodium, potassium, lithium salts and the amine salts, including the monoethylamine, diethylamine and methylamine salts of these acids. Magnesium sulfate may be employed.

The free sulfuric and oxalic acid solutions are preferred as the selective precipitating agents, since they do not introduce any foreign cations which might contaminate the metals. Additionally, when these acids are employed, it is possible to recover the nitric acid released from the thorium nitrate into the aqueous phase. This is not possible when salts of the sulfuric or oxalic acid are employed. Even more important is the fact that the solubility of the thorium sulfate precipitate which forms is less in a free sulfuric acid extract than in an aqueous extract of a sulfate salt. Other selective precipitating and extracting agents may be apparent to those skilled in the art.

The pH and acidity of the aqueous extracting system are not important.

It is preferred to employ as the organic solvent in which the mixed thorium and uranyl nitrates are dissolved, an alkyl phosphate (ester of phosphoric acid) such as tri-lower alkyl phosphates, preferably tributyl phosphate or mixtures thereof with hydrocarbon diluents, either aliphatic or aromatic. Among the diluents which may be employed are liquid hydrocarbons such as heptane, hexane, octane, the petroleum aliphatic solvent sold under the trade name of Varsol, as well as other obvious equivalents. Instead of alkyl phosphates, one may employ phosphonates, phosphinates, etc. The organic solvent and the organic solution should desirably possess a specific gravity less than that of the aqueous extracting and precipitating agent, otherwise the precipitate of thorium produced in the process of the invention remains in the organic phase and does not pass into the aqueous phase.

The ratio of the organic to aqueous phases may be varied at will. For optimum precipitation of the thorium, it is desirable that the aqueous precipitating agent shall be used in at least the stoichiometric quantity. It is desirable to employ high concentrations of solute in both the organic and aqueous phases, since this permits smaller volumes of liquid, and smaller losses of organic solvent by dissolving in water will result. It is preferred to employ organic solvent solutions of thorium nitrate containing between about 70% and 100% of total saturation. It is desirable that the upper concentration for sulfuric acid and water-soluble sulfates is about 4 molar and for oxalic acid and water-soluble oxalates about 2 molar. In the case of aqueous solutions of water-soluble sulfates and sulfuric acid, it is desirable to employ a concentration of at least about 0.5 molar. Preferred concentrations of sulfuric acid and water-soluble sulfates are between about 1.5 and 2.5 molar. For oxalic acid and water-soluble oxalate solutions, a concentration of between about 0.8 and 1.2 molar is preferred.

The process of the invention may be carried out by adding the aqueous solution of thorium precipitating agent to the organic solution of thorium and uranyl nitrates, while stirring, or vice versa. Furthermore, the simultaneous precipitation and extraction may be carried out continuously or batch-wise.

When using oxalic acid or water-soluble oxalates as precipitating agents, it is preferable to operate at temperatures above 40° C. in order to precipitate a dense and crystalline thorium oxalate. Because of the low solubility of thorium oxalate, it is sufficient to use a very slight excess of oxalic acid over the theoretical amount to extract and precipitate practically all the thorium initially present in the organic phase. To carry out this simultaneous selective extraction and precipitation, an aqueous solution of oxalic acid or of a water-soluble oxalate is added, while stirring, to the solution of thorium nitrate and uranyl nitrate in an organic solvent. As an alternative, the organic phase is added to the aqueous phase which contains the oxalic acid or water-soluble oxalate, while stirring. A dense precipitate is obtained, which transfers to the aqueous phase, without carrying the organic solvent or much of the uranyl nitrate with it. The process can also be accomplished continually in a "mixer-settler" or in an extraction column.

After filtration of the thorium oxalate, the nitric acid contained in the mother liquor can be regenerated by distillation, or else be used directly to dissolve more thorium-containing material.

When sulfuric acid or a water-soluble sulfate is used as a precipitating agent, the macrocrystalline structure of thorium sulfate makes it possible to use even more concentrated aqueous solution, without danger of emulsion forming or of carrying the organic solvent together with the precipitate. The greater solubility of the sulfate compared to that of the thorium oxalate, and the relatively small complex-forming power of the sulfate ion for thorium ions, demands a greater excess of the sulfate ion if it is desired to obtain a practically complete extraction of the thorium. Using sulfuric acid or a water-soluble sulfate, in 20 to 30% excess over the theoretical quantity, an extraction of more than 99% of the thorium originally contained in the organic phase is obtained, in only one stage.

The extraction of thorium by means of sulfuric acid or a water-soluble sulfate can be done either by adding the aqueous solution of the reagent to the organic solution of thorium nitrate, while stirring, or conversely. Additionally, the extraction can be done in a continuous or semi-continuous way.

In accordance with one feature of the process of the present invention, in an initial operation the greatest part of the thorium is extracted, using approximately the theoretically necessary amount of sulfate ion, followed by extracting the remaining thorium in a second operation, using thorium-precipitating reagent in excess. This second extract is subsequently used to extract the original organic solution. Such a counter-current extraction in two or more stages can also be performed in a continuous or semi-continuous way, using mixer-settlers or appropriate extraction columns. Also, the organic solution of thorium nitrate can be added in small portions to the aqueous solution of the thorium-precipitating reagent, with total or partial separation of the two phases after each addition.

The simultaneous extraction and precipitation of thorium with sulfuric acid or water-soluble sulfate is desirably conducted at temperatures below about 50° C., to assure the precipitation of thorium sulfate as the crystalline nonahydrate. Since the solubility of thorium sulfate decreases with the decrease of temperature (below the crystalline transition point at 43° C.), it is advantageous to extract and precipitate the thorium at a low temperature, preferentially between 0° C. and 20° C. As an alternative, the aqueous phase can be cooled after its separation from the organic phase, in order to reduce the solubility of thorium sulfate. The amount of thorium sulfate which remains in aqueous solution at temperatures between 0° C. and 20° C. is 3 to 8 grams per liter of thorium nitrate calculated as $ThO_2$.

The process of the present invention, employing the selective precipitating and extracting agent for thorium, possesses a number of advantages. The distribution coefficient of thorium between the organic and aqueous phases, is raised drastically in favor of the latter, so that complete, or almost complete, extraction is made possible in a single stage, or very few stages, while using a low aqueous to organic solvent volume ratio. Since fewer stages and less materials are involved, with an appreciable reduction in the losses of organic solvent, the processes of the invention provide important processing economies. Because of the great increase in separation of thorium from uranium, an effective purification of thorium is made possible. Selective and simultaneous precipitation and extraction of thorium oxalate or thorium sulfate in the course of the process of the present invention also assists in the separation of thorium from other elements in addition to uranium, such as europium, which may be present in the initial organic solvent solution.

Since the use of the precipitating agent in the aqueous extracting phase makes it possible to minimize the volume ratio of the aqueous to organic phases, and at the same time provide a high acidity and/or concentration of nitrates in the aqueous extracting phase, this influences the distribution of uranium nitrate in favor of the organic phase. This assists in the effectiveness of the separation of the thorium from uranium, since the latter remains predominantly in the organic solvent, thereby reducing the amount of uranium contaminating the thorium sulfate or oxalate which is transferred to the aqueous phase. The process of the invention makes it possible to recover thorium without co-extracting more than 1% of the original uranium present in the organic solvent starting solution. In actual practice, it is possible to obtain uranium-thorium decontamination factors (degree of separation) of about 400 when using oxalate precipitation and 10,000 when using sulfate precipitation, yet recover up to 99.9% of the thorium originally present in the organic solvent starting solution. Under these circumstances, up to 99% of the initial uranium remains in the organic phase and is effectively separated from the thorium.

An additional advantage of the process of the present invention over the processes of the prior art is the ease of recovery of the nitric acid which is liberated from the organic phase. When employing sulfuric acid to simultaneously precipitate and extract the thorium, there is obtained after the crystallization and filtration of the thorium sulfate precipitate, an aqueous solution which may readily contain a concentration of 3 normal free nitric acid. This nitric acid can be recovered economically from the comparatively concentrated solution by distillation. Also, after precipitating any free sulfates as barium sulfate, the resulting nitric acid solution may be employed to dissolve more raw starting material containing thorium and uranium.

In order more clearly to disclose the nature of the present invention, the following examples illustrating the invention are disclosed. It should be understood, however, that this is done solely by way of example and is intended neither to delineate the scope of the invention nor limit the ambit of the appended claims. In the examples which follow, and throughout the specification, the quantities of materials are expressed in terms of parts by weight, unless otherwise specified.

Example I 1 liter of a starting solution of thorium and uranyl nitrates in a mixture of 46.5 parts by volume of tributyl phosphate and 53.5 parts by volume of Varsol, containing 106 grams (0.4 mole) of thorium nitrate (calculated as thorium oxide) and 1.8 grams of uranyl nitrate (calculated as uranium metal) was heated to 50° C. Then, over a period of one hour, first 200 ml. of water followed by 800 ml. of one molar solution of oxalic acid were added, while stirring, to the starting solution of nitrates, the temperature being maintained between 45° C. and 50° C. Stirring was continued for another hour. The thoium oxalate which precipitated and passed into the aqueous phase occupied a volume of about 40% of the aqueous phase. After separation of the organic phase, the thorium oxalate precipitate was filtered from the aqueous phase and washed with water. The organic phase was practically free of thorium or its salts and contained 97.5% of the original uranium content. The thorium oxide which was obtained upon calcination of the precipitated thorium oxalate at 950–1000° C., contained only 40 parts per million of uranium, which means that the factor of decontamination or purification was about 425.

In repeating the process, in which the organic starting solution of thorium and uranyl nitrates contained 116 g./l. of thorium calculated as thorium oxide and 0.44 g./l. of uranyl nitrate (calculated as uranium metal) and the oxalic acid solution was 0.5 molar, the thorium oxide recovered from the precipitated oxalate contained only 13 parts per million of uranium, which corresponds to a decontamination factor of 300.

The Varsol employed in the foregoing example and in others of the examples is a petroleum aliphatic hydrocarbon solvent having a specific gravity of 0.78 at 15° C., a boiling point range of 160–205° C., flash point of 35° C., and an aromatic content of only 8 to 12%.

Example II

The process described in Example I was repeated except the solution of thorium and uranyl nitrates in tributyl phosphate-Varsol solvent was added to the oxalic acid solution, stirred and heated to 50° C. The precipitate of thorium oxalate which was obtained, possessed only half the volume that had been obtained in Example I. The organic phase was practically free of thorium content and contained 97% of the uranium originally present in it. The thorium oxide obtained upon calcination of the thorium oxalate contained only 75 parts per million of uranium, which corresponds to a decontamination factor of 240.

Example III

To 1 liter of a starting solution of thorium, uranyl and europium nitrates dissolved in a mixture of 47 parts by volume of tributyl phosphate and 53 parts by volume of Varsol, containing 106 grams of thorium nitrate (calculated as thorium oxide), 0.5 gram of uranyl nitrate (calculated as uranium metal), 0.3 gram of europium nitrate (calculated as europium oxide) and a concentration of free nitric acid 0.2 normal, there were added, while stirring, over a period of one hour, 590 ml. of 1.77 molar sulfuric acid, which corresponds to 130% of the amount necessary to precipitate all the thorium as thorium sulfate. Temperature was maintained at 25° C. After another hour of stirring at 25° C., the organic phase was separated from the aqueous phase, the latter containing the crystalline precipitate of thorium sulfate. In the organic phase remained 0.68 gram per liter of thorium (calculated as thorium oxide) which corresponds to only 0.6% of the amount in the starting solution and 0.52 gram per liter of uranium (calculated as uranium metal) which corresponds to 96% of the original amount (taking into account the 7% reduction of the organic phase volume). (The starting solution was prepared in the same manner as in Example I.)

The aqueous phase was maintained at 5° C. for 4 hours; after which the thorium sulfate precipitate was filtered and washed with a small quantity of ice-cold water. In the filtrate remained only 4.3 g. of thorium (calculated as thorium oxide), which corresponds to only 4% of the original amount of thorium. The thorium oxide obtained by calcination of the thorium sulfate, contained only 2 parts per million of uranium and only 200 parts per million of europium oxide. Thus there was obtained over 95% of the thorium originally present, decontaminated from uranium by a factor of about 2500 and from europium by a factor of about 15.

The above process was repeated employing 1 molar sulfuric acid, with substantially the same results. The yield of crystallized sulfate decreased to 93%, but the decontamination factor for the uranium increased to about 5000.

Example IV

The process of Example III was repeated except that the sulfuric acid was replaced with ammonium sulfate in 1 molar aqueous solution, employing an excess of 20% over the theoretical or stoichiometric amount. The organic phase which separated from the aqueous phase contained only 0.4% of the original amount of thorium and 95% of the original amount of uranium. The yield of crystallized thorium sulfate was only 84%, because of its greater solubility in the presence of ammonium sulfate. However, the decontamination factor for europium increased considerably, to about 75. The thorium oxide obtained from calcination of the sulfate contained only 40 parts per million of europium oxide and about 1 part per million of uranium.

Example V

In this example the organic starting solution of nitrates was dissolved in a mixture of 47 parts by volume of tributyl phosphate and 53 parts by volume of Varsol, containing 110 grams per liter of thorium nitrate (calculated as thorium oxide), 0.48 gram per liter of uranyl nitrate (calculated as uranium metal), and 0.17 gram per liter of europium nitrate (calculated as europium oxide). The solution contained free nitric acid at a concentration of 0.22 normal.

To 1 liter of this starting solution were added, while stirring, at 20° C., in the course of 30 minutes, 500 ml. of a 1.82 molar solution of sulfuric acid, which corresponds to 110% of the theoretical amount, to convert the thorium to the sulfate, this solution containing nitric acid at a concentration of 1 normal. After 1 hour of agitation, the organic phase was separated from the aqueous phase, the latter containing the crystalline precipitate of thorium sulfate. The aqueous phase was maintained at 0° C. for 3 hours; after that the thorium sulfate was filtered and washed with a small quantity of ice-cold water, the main filtrate and the wash water being stored separately. The organic phase, which still contained 7 grams of thorium (calculated as thorium oxide), was extracted in a repeated procedure with 450 ml. of 1 molar sulfuric acid. To prepare this solution, the wash water of the thorium sulfate was used. After separation of the phases, the organic phase contained only 0.15 gram of thorium, calculated as the oxide. To the aqueous phase resulting from this second operation, which still contained some crystallized thorium sulfate and which contained free nitric acid at a concentration of about 1 normal, 47 grams of sulfuric acid were added, the volume was adjusted with water to 500 ml., and this was used as a reagent for extracting again 1 liter of the original organic solution. These operations were repeated several times, in order to achieve an equilibrium in the extraction system.

Once reaching this equilibrium, the aqueous phase of the first extraction contained more than 99.8% of the thorium originally present in the organic phase. Crystallization yield was 97 to 98%; the thorium oxide obtained from the sulfate by calcination at 950–1000° C. contained only about 1 part per million of uranium and only 90 to 120 parts per million of europium (calculated as the oxide), which corresponds to a decontamination factor of about 5000 with respect to uranium and of about only 20 with respect to europium. The aqueous solution, separated from the thorium sulfate crystals, contained about 5 g./l. of thorium (calculated as the oxide), 35–40 g./l. of sulfate ion and free nitric acid in a concentration of about 2.9 to 3 normal. The sulfate ion was precipitated out of this solution by addition of the theoretical amount of barium carbonate. After filtration, this solution was used to dissolve crude thorium hydroxide.

After the extraction process, the organic phase was found to contain an average of 0.15 g./l. of thorium, calculated as the oxide, which corresponds to about only 0.13% of the original amount of thorium. About 98% of the original amount of uranium was still present in the organic phase.

In repeating this process, the concentration of uranium nitrate in the organic starting solution was increased to 5.2 grams per liter (calculated as free metal), the other concentrations remaining the same. Once an equilibrium was established in the two-stage extraction system, there was obtained from the crystallized thorium sulfate a thorium oxide (after calcination) with only 2 to 3 parts per million of uranium, which corresponds to a decontamination factor of about 20,000 with respect to uranium. At the end of the process, the organic phase contained 99% of the original uranium, this latter having been decontaminated from thorium by a factor of about 600.

Example VI

To 5 liters of a solution containing 465 grams (i.e., 4.75 moles) of sulfuric acid, and was 0.6 normal with respect to nitric acid, there was added, while stirring, 1 liter of a thorium, uranium and europium nitrates solution dissolved in a mixture of 46 parts by volume of tributyl phosphate and 54 parts by volume of Varsol, the nitrates solution contained 113.4 g./l. of thorium nitrate calculated as $ThO_2$, 0.45 g./l. of uranium nitrate calculated as the metal, and 0.18 g./l. of europium nitrate calculated as $Eu_2O_3$. After 15 minutes of stirring the organic phase was separated from the aqueous phase, and to the latter was added another liter of the organic solution; this operation was repeated 10 times in all. The 5 first organic phases contained less than 0.1 g./l. of thorium calculated as $ThO_2$. The 5 subsequent ones contained respectively 0.39, 0.79, 1.45, 3 and 7.3 g./l. The organic phases all together contained 1.2% of the thorium and 95% of the uranium originally present. The thorium sulfate crystalized from the aqueous phases at 10° C. with a yield of 97% of the original thorium present contained less than one part per million of uranium (calculated on thorium oxide). The aqueous phase, separated from the thorium sulfate crystals by filtration, contained 36 g./l. of sulfate ion and free nitric acid in a concentration of 2.96 molar. After precipitation of the sulfate ion as barium sulfate, it was used to dissolve more thorium containing material from ores or thorium containing ore concentrates.

Example VII

To 1 liter of a starting solution of thorium and uranyl nitrates in a mixture of 46 parts by volume of tributyl phosphate and 54 parts by volume of heptane, which contained 149 g./l. of thorium calculated as $ThO_2$, 2.8 g./l. of uranium nitrate calculated as the free metal and nitric acid at a concentration of 0.3 molar were added, while stirring, 735 ml. of 2 molar sulfuric acid, which corresponds to an excess of 30% over the quantity calculated to transform all thorium into the sulfate. After one hour of agitation at 20° C., the organic and aqueous phases were separated, the precipitated thorium sulfate was filtered from the aqueous phases and washed with 250 ml. water. In the organic phase remained only 1.2 g./l. of thorium calculated as thorium oxide and 94% of the uranium originally present. The yield of crystallized thorium sulfate was 93% of the theoretical yield, 11 g. thorium calculated as $ThO_2$ remaining in the aqueous filtrate and washing.

Example VIII

To 1 liter of a solution of thorium and uranyl nitrates in a mixture of 30 parts by volume of tributyl phosphate and 70 parts by volume of xylene, containing 90.5 g./l. of thorium nitrate calculated as $ThO_2$, 2.7 g./l. of uranium nitrate calculated as the free metal and nitric acid at a concentration of 0.05 normal, were added, while stirring, over a period of 30 minutes, 452 ml. of 2 molar sulfuric acid, which corresponds to an excess of 30% over the quantity necessary to precipitate the thorium as the sulfate. The mixture was agitated for 2 hours at 22° C. and then the organic phase was separated from the aqueous phase, the latter containing the precipitate of thorium sulfate. The precipitate was filtered from the aqueous phase and washed with 150 ml. of ice-cold water. In the organic phase remained only 0.36 g./l. of the thorium calculated as $ThO_2$ and 96.5% of the uranium originally present. The yield of crystallized thorium sulfate was 94% of the theoretical yield, 5.2 of thorium calculated as $ThO_2$ remaining in the aqueous filtrate and washing.

Example IX

The process of Example VIII was repeated except that 3.5 molar sulfuric acid was employed as the extracting and precipitating agent. The quantity used was 235 ml. which corresponds to an excess of 20% of the stoichiometric amount. The organic phase contained 0.16 g./l. of thorium calculated as $ThO_2$ and 98.5% of the original uranium content. Yield of crystallized thorium sulfate was 98% of the theoretical yield.

Example X

To 1 liter of starting solution of thorium and uranyl nitrates in pure tributyl phosphate, containing 140 g./l. of thorium nitrate calculated as $ThO_2$ and 2.7 g./l. of uranyl nitrate calculated as free metal, there were added, while stirring, during one hour, 314 ml. of 4 molar sulfuric acid, which corresponds to an excess of 20% of the stoichiometric amount. The mixture was agitated at 22° C. for 2 hours. The volume of the aqueous phase was just sufficient to hold the entire volume of the resulting precipitate of the thorium sulfate. After separation of the organic and aqueous phases, the precipitate crystals were filtered from the aqueous phase and washed with 200 ml. water. The organic phase contained only 0.65 g./l. of thorium calculated as $ThO_2$ and 98% of the original uranium content. The yield of crystallized thorium sulfate was 98% of the theoretical yield.

As will be apparent to those skilled in the art, other selective precipitating agents may be employed in any of the foregoing examples in place of the oxalic and sulfuric acids or ammonium sulfate. Thus any water-soluble oxalate, bisulfate or sulfate salts may be employed, such as the ammonium, alkali-metal salts, including the sodium, potassium and lithium salts, and the amine salts, including the monoethylamine, diethylamine and methylamine salts. Because of their lower solubility in water, the oxalate, bisulfate and sulfate salts are less preferred than the free acids. The free acids are preferred because of their greater water-solubility and the fact that they do not introduce any contaminating cations.

The terms and expressions which have been employed are used as terms of description and not of limitation, and it is not intended, in the use of such terms and expressions, to exclude any equivalents of the features shown and described or portions thereof, but it is recognized that various modifications are possible within the scope of the invention claimed.

What is claimed is:

1. A process for the separation of thorium from uranium in solution as nitrates in a water-immiscible, organic solvent comprising an ester of phosphoric acid in which the thorium nitrate is present in a concentration of from about 70 to 100% of total saturation, the step which comprises mixing with each other said water-immiscible, organic solvent containing thorium and uranium nitrates with an aqueous solution containing about 1.5 to 2.5 molar concentration of a precipitating agent, which precipitating agent is a member selected from the class consisting of sulfuric acid and water-soluble sulfates and bisulfates, whereby the thorium values are selectively and simultaneously precipitated from the solution and separated from the uranium values.

2. A process for the separation of thorium from uranium is solution as nitrates in a water-immiscible, organic solvent comprising an ester of phosphoric acid in which the thorium nitrate is present in a concentration of from about 70 to 100% of total saturation, the step which comprises mixing with each other said water-immiscible, organic solvent containing thorium and uranium nitrates with an aqueous solution containing about 0.8 to 1.2 molar concentration of a precipitating agent, which precipitating agent is a member selected from the class consisting of oxalic acid and water soluble oxalates, whereby the thorium values are selectively and simultaneously precipitated from the solution and so separated from the uranium values.

References Cited in the file of this patent

UNITED STATES PATENTS

| | | |
|---|---|---|
| 2,815,264 | Calkins | Dec. 3, 1957 |
| 2,877,087 | McVey et al. | Mar. 10, 1959 |
| 2,883,264 | Warf | Apr. 21, 1959 |
| 2,902,454 | Moore | Sept. 1, 1959 |
| 2,905,524 | Mahut | Sept. 22, 1959 |
| 2,945,742 | Christensen et al. | July 19, 1960 |
| 2,951,740 | Hopkins | Sept. 6, 1960 |

OTHER REFERENCES

Brown: ORNL–1384, June 30, 1952, pp. 115–121.
Whatley: ISC–415, July 1953, page 33.
Whatley: ISC–415, July 1953, pp. 7–9, 17–22, 59, and 60.

UNITED STATES PATENT OFFICE
CERTIFICATE OF CORRECTION

Patent No. 3,104,940                          September 24, 1963

Kazimierz Josef Bril et al.

It is hereby certified that error appears in the above numbered patent requiring correction and that the said Letters Patent should read as corrected below.

Column 2, line 18, for "precipitates" read -- precipitate --; column 5, line 16, for "thoium" read -- thorium --; column 8, line 31, for "5.2" read -- 5.2 g. --; column 9, line 23, for "is" read -- in --.

Signed and sealed this 7th day of April 1964.

(SEAL)
Attest:

ERNEST W. SWIDER
Attesting Officer

EDWARD J. BRENNER
Commissioner of Patents